United States Patent
Takahashi et al.

(10) Patent No.: US 9,222,424 B2
(45) Date of Patent: Dec. 29, 2015

(54) INTERNAL COMBUSTION ENGINE FITTED WITH COMBUSTION PRESSURE DETECTION DEVICE

(71) Applicants: Kazuo Takahashi, Kitasaku-gun (JP); Yoshihiko Soga, Kitasaku-gun (JP); Tsuyoshi Misaizu, Kitasaku-gun (JP)

(72) Inventors: Kazuo Takahashi, Kitasaku-gun (JP); Yoshihiko Soga, Kitasaku-gun (JP); Tsuyoshi Misaizu, Kitasaku-gun (JP)

(73) Assignees: CITIZEN FINEDEVICE CO., LTD., Fujikawaguchiko (JP); CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/384,999

(22) PCT Filed: Mar. 15, 2013

(86) PCT No.: PCT/JP2013/057391
§ 371 (c)(1),
(2) Date: Sep. 12, 2014

(87) PCT Pub. No.: WO2013/137432
PCT Pub. Date: Sep. 19, 2013

(65) Prior Publication Data
US 2015/0034039 A1    Feb. 5, 2015

(30) Foreign Application Priority Data

Mar. 16, 2012 (JP) ................................. 2012-061049
Mar. 16, 2012 (JP) ................................. 2012-061053

(51) Int. Cl.
*F02D 35/02*      (2006.01)
*G01L 23/10*      (2006.01)
(Continued)

(52) U.S. Cl.
CPC .............. *F02D 35/023* (2013.01); *F02B 23/00* (2013.01); *G01L 9/008* (2013.01); *G01L 23/10* (2013.01); *G01L 23/22* (2013.01)

(58) Field of Classification Search
CPC ...... F02D 35/023; F02B 23/00; G01M 15/08; G01L 7/00; G01L 23/10; G01L 23/22; G01L 23/222
USPC ................. 73/35.12, 35.13, 715, 756, 114.16, 73/114.18, 114.57; 251/170, 335.2, 335.1
See application file for complete search history.

(56) References Cited

U.S. PATENT DOCUMENTS 4,982,608 A    1/1991   Marki et al.
6,575,039 B2 *   6/2003   Murai et al. .................... 73/756
(Continued)

FOREIGN PATENT DOCUMENTS

CN     202010034 U    10/2011
DE     8903667 U1    5/1989
(Continued)

OTHER PUBLICATIONS

International Search Report issued in International Patent Application No. PCT/JP2013/057391 mailed Jun. 18, 2013.
(Continued)

*Primary Examiner* — Lindsay Low
*Assistant Examiner* — Grant Moubry
(74) *Attorney, Agent, or Firm* — Oliff PLC

(57) ABSTRACT

An internal combustion engine fitted with a combustion pressure detection device includes: an internal combustion engine having a combustion chamber, a pressure detection device having a housing, a diaphragm, and a detection member, and having a shoulder part. The diaphragm is provided on the front end side of the housing and the detection member arranged inside the housing and behind the diaphragm, allowing it to detect the pressure working via the diaphragm. Also provided is a second seal member in a ring shape that seals the opening in the combustion chamber and the housing in the shoulder part of the housing in the pressure detection device.

6 Claims, 9 Drawing Sheets

(51) Int. Cl.
  *G01L 23/22* (2006.01)
  *G01L 9/00* (2006.01)
  *F02B 23/00* (2006.01)

(56) References Cited

U.S. PATENT DOCUMENTS

| | | | |
|---|---|---|---|
| 6,736,013 B2 * | 5/2004 | Babala et al. | 73/715 |
| 7,472,600 B2 * | 1/2009 | Wolfer et al. | 73/723 |
| 7,905,209 B2 * | 3/2011 | Goto et al. | 123/143 R |
| 2001/0015402 A1 | 8/2001 | Murai et al. | |
| 2006/0090544 A1 | 5/2006 | Yorita et al. | |
| 2007/0245806 A1 * | 10/2007 | Hirose et al. | 73/35.13 |
| 2008/0223139 A1 * | 9/2008 | Hirose et al. | 73/715 |

FOREIGN PATENT DOCUMENTS

| | | |
|---|---|---|
| JP | U-2-58171 | 4/1990 |
| JP | A-2-206738 | 8/1990 |
| JP | 2001-182937 A | 7/2001 |
| JP | 2006-132356 A | 5/2006 |
| JP | 2007-187609 A | 7/2007 |
| JP | A-2008-191059 | 8/2008 |
| JP | 2009-122076 A | 6/2009 |
| JP | A-2009-122076 | 6/2009 |
| JP | A-2010-48734 | 3/2010 |
| JP | 2011-149857 A | 8/2011 |

OTHER PUBLICATIONS

Oct. 26, 2015 Extended European Search Report issued in European Application No. 13761640.5.

\* cited by examiner

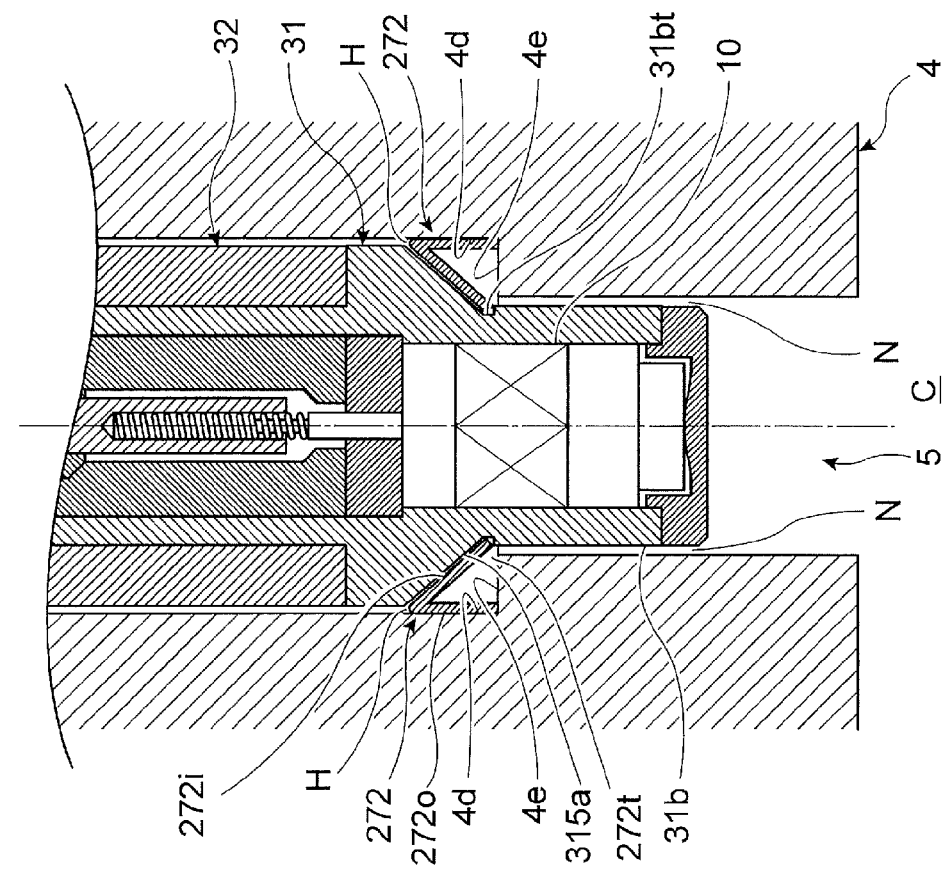
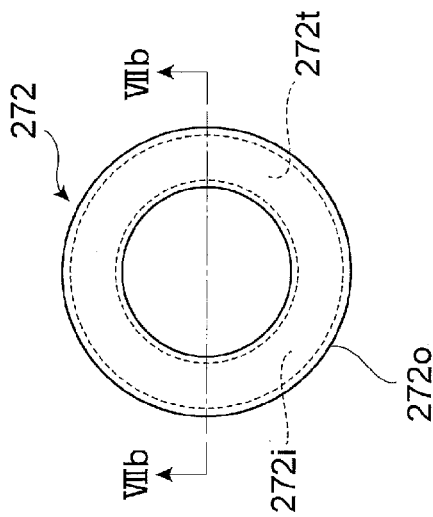
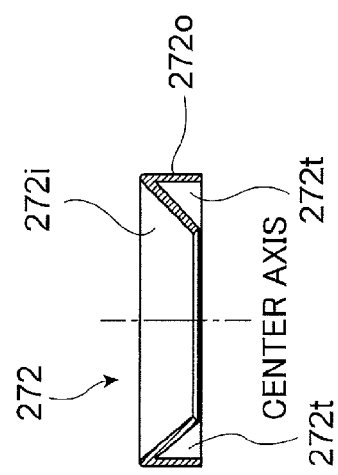

INTERNAL COMBUSTION ENGINE FITTED WITH COMBUSTION PRESSURE DETECTION DEVICE

TECHNICAL FIELD

The present invention relates to an internal combustion engine fitted with a combustion pressure detection device.

BACKGROUND ART

In recent years, an internal combustion engine fitted with a combustion pressure detection device for detecting a pressure inside a combustion chamber has been known. In such an internal combustion engine, it is necessary to suppress leakage of combustion gas from an fitting portion of the combustion pressure detection device in the combustion chamber, or to prevent inflow of the combustion gas to the combustion pressure detection device.

For example, a combustion pressure detection device described in Patent Document 1 includes a diaphragm at a front end part of a main body formed in a cylindrical shape, and in a combustion pressure sensor that is provided by being inserted into an insertion hole provided at a combustion chamber wall so as to be able to detect combustion pressure in a combustion chamber acting via the diaphragm by a sensor part configured with a piezoelectric element arranged at the back of the diaphragm, a gas-sealing part protruding in the radial direction is provided at the front end part of the main body thereof, and the gas-sealing part is configured to face an inner wall surface of the insertion hole in the radial direction so as to be brought into press contact therewith.

CITATION LIST

Patent Literature

Patent Document 1: Japanese Patent Application Laid-Open Publication No. 2008-191059

DISCLOSURE OF INVENTION

Technical Problem

Here, in the combustion pressure detection device, by the combustion gas flowing into a gap between the combustion pressure detection device and an internal combustion engine to which the combustion pressure detection device is fitted, a temperature of an outside member is rapidly increased. On the other hand, compared to the temperature of the outside, a temperature of an inside member can hardly rise immediately. As a result, expansion difference between the inside member and the outside member due to temperature difference between the inside and outside of the device is generated, and a load acting on a detection member that detects pressure is affected by the expansion difference.

For example, by relative extension of the outside member with respect to the inside member, a member that is to apply pressure to the detection member is brought into a pulled state, and thereby a gap is generated with the detection member. In this case, in spite of the state where, in nature, the load should be imposed on the detection device and a predetermined pressure should be detected, there is a possibility that a detection error, such as reduced pressure or no pressure detected by the detection member, may occur. To suppress occurrence of such a detection error, it is effective to suppress inflow of the combustion gas to the gap between the internal combustion engine and the combustion pressure detection device.

An object of the present invention is to securely prevent inflow of the combustion gas to the gap between the internal combustion engine and the combustion pressure detection device fitted therewith.

Solution to Problem

According to the object, the present invention is an internal combustion engine fitted with a combustion pressure detection device, including: an internal combustion engine including a combustion chamber and an opening formed on a wall surface constituting the combustion chamber, the opening connecting to the combustion chamber and having a wider diameter on a near side than on a far side thereof; a combustion pressure detection device including: a housing having a cylindrical shape that is insertable into the opening of the internal combustion engine, the housing being narrower on a front end side thereof in an insertion direction in accordance with the diameter of the opening on the far side, and being wider on a rear end side thereof in accordance with the diameter of the opening on the near side, and the housing having a shoulder part between the front end side and the rear end side thereof; a diaphragm provided on the front end side of the housing in the insertion direction; and a detection member arranged inside the housing and behind the diaphragm, and detecting the pressure working via the diaphragm; and a seal member in a ring shape that has a cross section in an opening shape, the seal member sealing the opening in the combustion chamber and the housing at the shoulder part of the housing in the combustion pressure detection device, wherein the housing includes a step part on the front end side in the insertion direction relative to the shoulder part, and the seal member is held by the housing by latching an opening edge part of an opening part in the opening shape onto the step part.

Here, it is preferable that, in the seal member, the opening part is in a state opened toward the combustion chamber.

Further, it is preferable that the detection member of the combustion pressure detection device is provided on an end part of the housing, which is on a side of the housing that faces the combustion chamber, and the shoulder part of the housing is formed at a position of the detection member in the insertion direction.

Then, it is preferable that the shoulder part of the housing is a tapered part having a diameter that gradually increases from the front end side toward the rear end side.

Moreover, it is preferable that an outer seal member that is pushed in a same direction as the insertion direction of the housing, to thereby seal a space between the housing and the combustion chamber at an outside of the opening formed on a wall surface constituting the combustion chamber, is further provided.

Further, it is preferable that the seal member has a cross section in a horseshoe shape, and is provided along an inner wall of the opening formed on a wall surface constituting the combustion chamber and the tapered part of the housing.

Advantageous Effects of Invention

According to the present invention, it becomes possible to securely prevent inflow of the combustion gas to the gap between the internal combustion engine and the combustion pressure detection device fitted therewith.

BRIEF DESCRIPTION OF DRAWINGS

FIGS. 7A to 7C are diagrams for illustrating the internal combustion engine according to Exemplary embodiment 2;

DESCRIPTION OF EMBODIMENTS

Hereinafter, exemplary embodiments according to the present invention will be described in detail with reference to attached drawings.

Exemplary Embodiment 1

Figure 1:
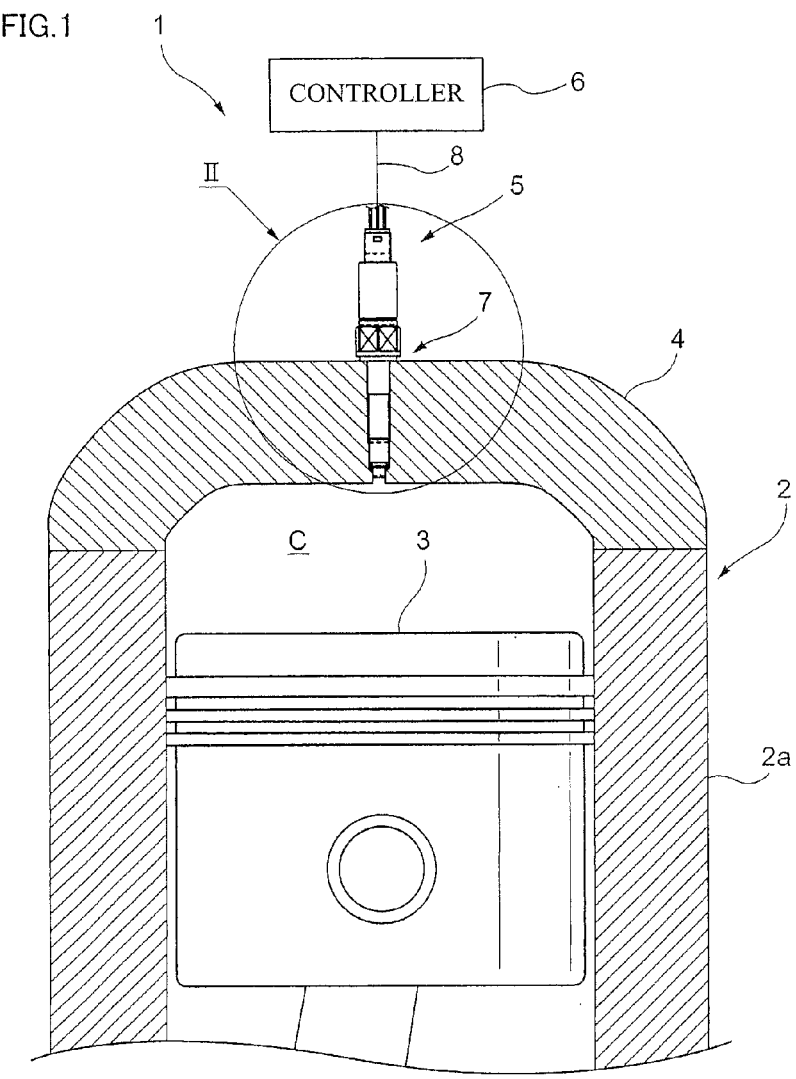
FIG. 1 is a schematic configuration diagram of an internal combustion engine according to exemplary embodiments.

FIG. 1 is a schematic configuration diagram of the internal combustion engine according to this exemplary embodiment.

Figure 2:
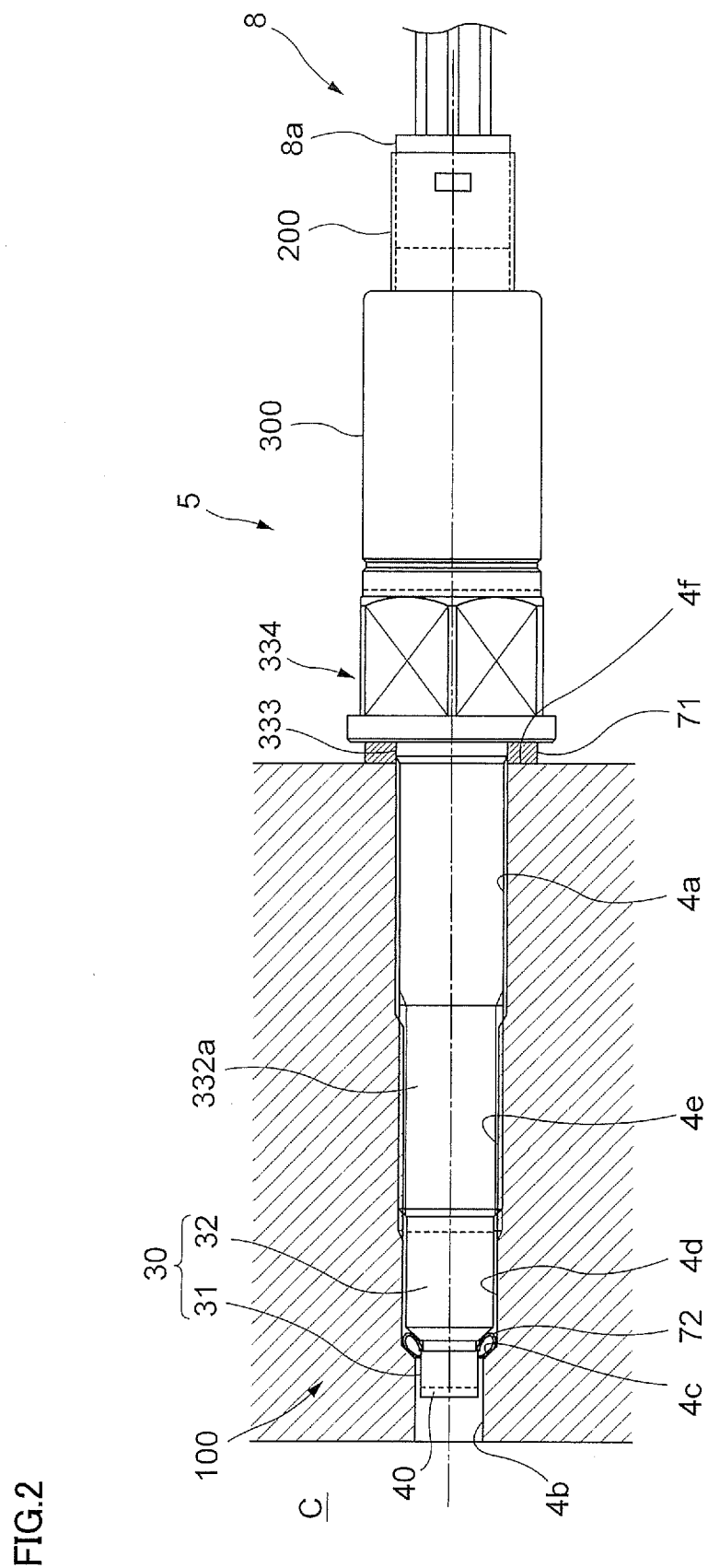
FIG. 2 is an enlarged diagram of a section II in FIG. 1.

FIG. 2 is an enlarged diagram of a section II in FIG. 1.

As shown in FIG. 1, the internal combustion engine 1 includes: a cylinder block 2 that has a cylinder 2a; a piston 3 that is reciprocated in the cylinder 2a; and a cylinder head 4 that is fastened to the cylinder block 2 and forms a combustion chamber C with the cylinder 2a, the piston 3 and the like. Moreover, the internal combustion engine 1 includes: a pressure detection device 5 that is mounted to the cylinder head 4 and detects pressure inside the combustion chamber C; a controller 6 that controls actuation of the internal combustion engine 1 on the basis of the pressure detected by the pressure detection device 5; a seal part 7 that is interposed between the pressure detection device 5 and the cylinder head 4 to maintain airtightness of the inside of the combustion chamber C; and a transmission cable 8 that transmits an electric signal between the pressure detection device 5 and the controller 6.

As shown in FIG. 2, in the cylinder head 4, a communication hole 4a, as an example of an opening, that communicates the combustion chamber C and the outside with each other is formed. A cross section of the communication hole 4a in the exemplary embodiment has a circular shape. The communication hole 4a has a first hole part 4b, an inclined part 4c with a diameter gradually increasing from a hole diameter of the first hole part 4b, and a second hole part 4d that has a larger hole diameter than the first hole part 4b. A female screw 4e into which a later-described male screw 332a of a housing 30 formed in the pressure detection device 5 is screwed is formed on a peripheral wall forming the second hole part 4d.

Hereinafter, detailed description will be given of the pressure detection device 5.

Figure 3:
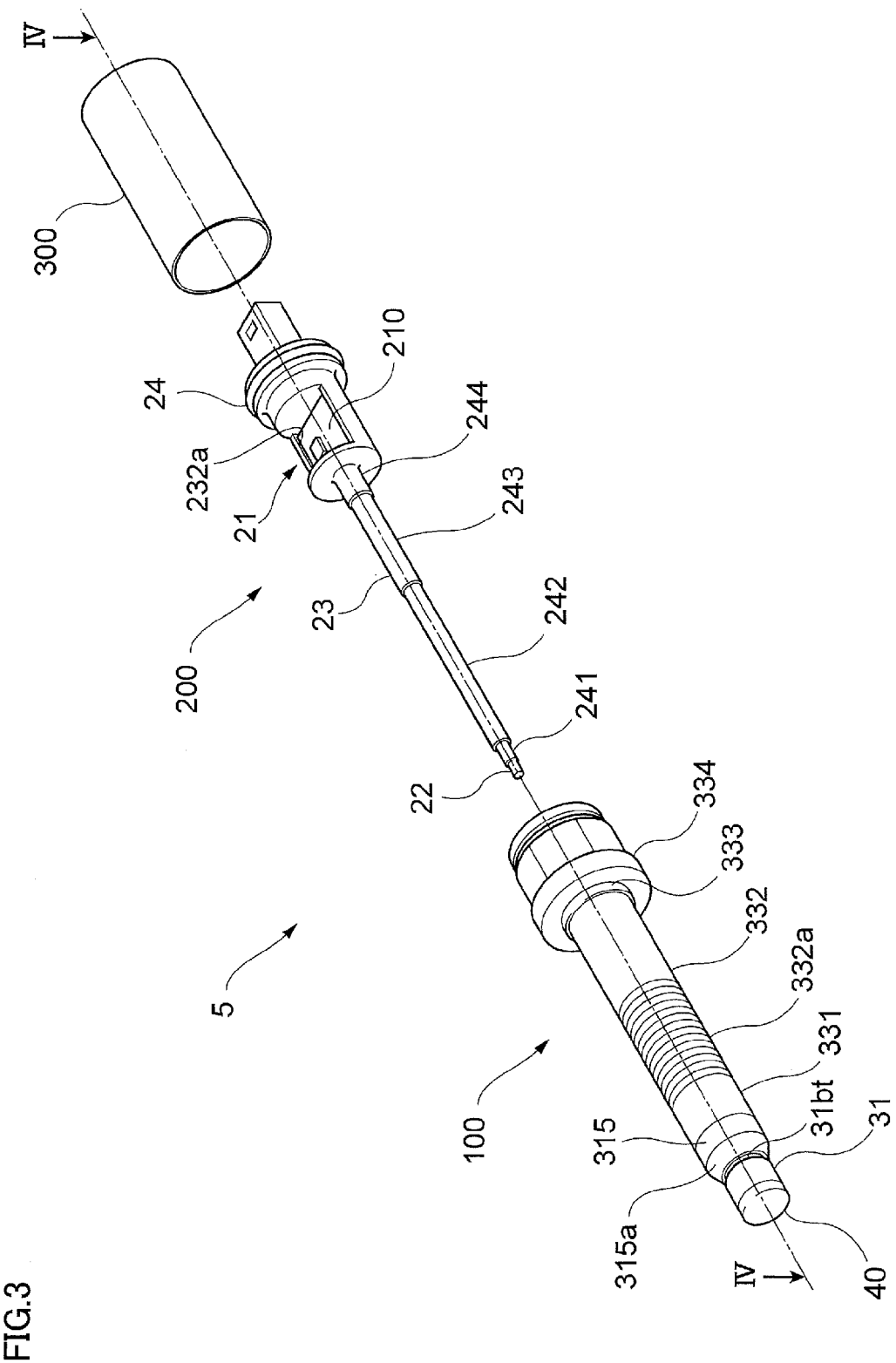
FIG. 3 is a schematic configuration diagram of the pressure detection device.
Figure 4:
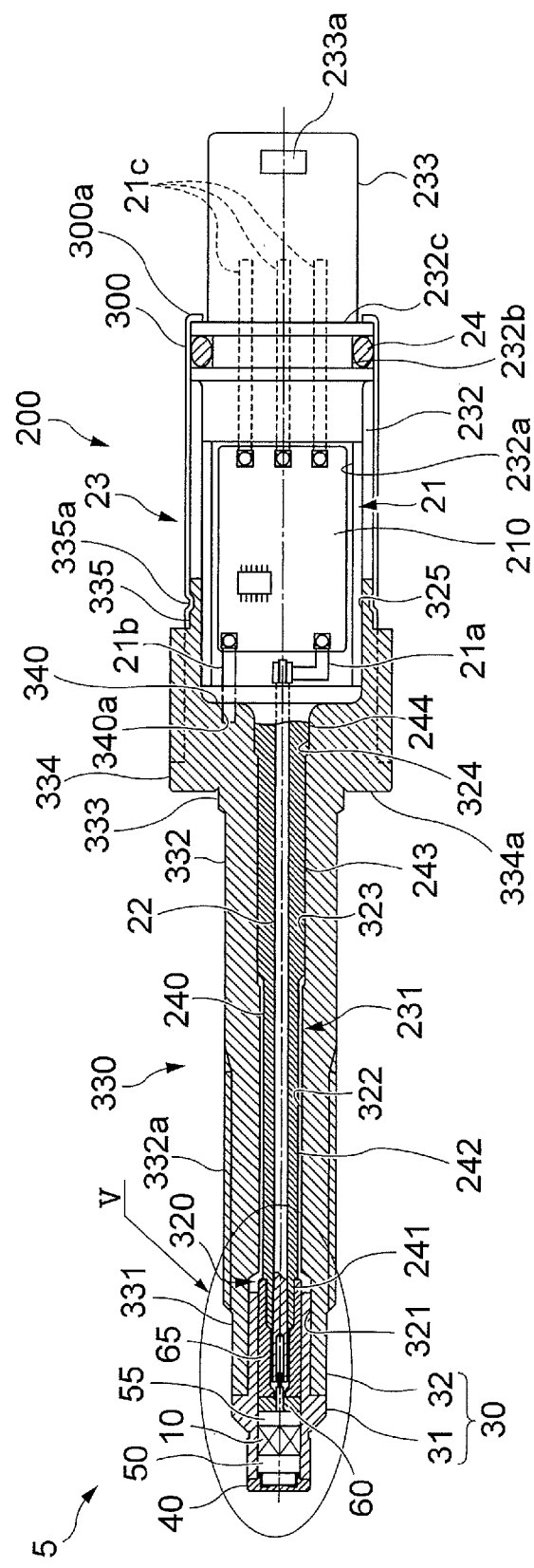
FIG. 4 is a cross-sectional diagram of a section IV-IV in FIG. 3.
Figure 5:
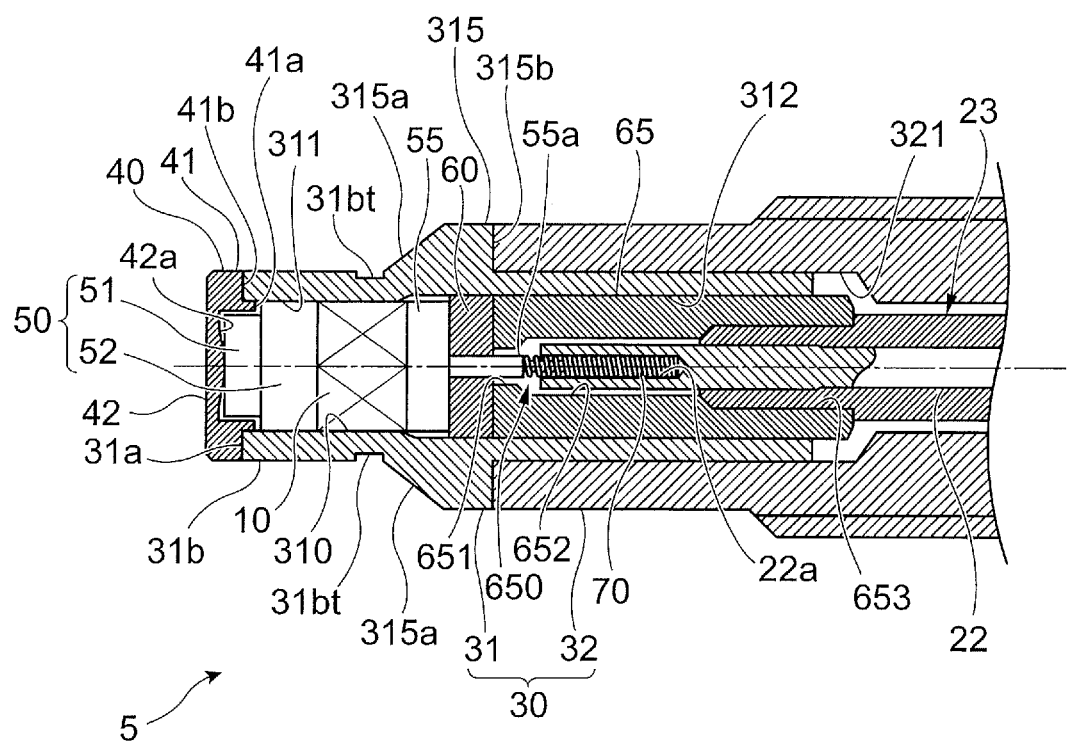
FIG. 5 is an enlarged diagram of a section V in FIG. 4.

FIG. 3 is a schematic configuration diagram of the pressure detection device 5. FIG. 4 is a cross-sectional diagram of a section IV-IV in FIG. 3. FIG. 5 is an enlarged diagram of a section V in FIG. 4.

As shown in FIG. 3, the pressure detection device 5, as an example of a combustion pressure detection device, includes: a sensor part 100 that has a piezoelectric element 10 transforming the pressure inside the combustion chamber C into an electric signal; a signal processor 200 that processes the electric signal from the sensor part 100; and a holding member 300 that holds the signal processor 200. As shown in FIG. 2, when the pressure detection device 5 is mounted to the cylinder head 4, the pressure detection device 5 is inserted into the communication hole 4a formed in the cylinder head 4, firstly from a later-described diaphragm head 40 side of the sensor part 100.

First, description will be given of the sensor part 100.

As shown in FIGS. 4 and 5, the sensor part 100 includes: the piezoelectric element 10 that transforms applied pressure into an electric signal; and a housing 30 which is formed into a tube and in which a cylindrical hole for containing the piezoelectric element 10 and so on is formed.

It should be noted that, hereinafter, the centerline direction of the cylindrical hole formed in the housing 30 is simply referred to as a centerline direction. Moreover, in the following description, the left side in FIG. 4 is referred to as a front end side of the pressure detection device 5, and the right side is referred to as a rear end side of the pressure detection device 5.

The sensor part 100 includes: the diaphragm head 40 which is provided to seal an opening of the housing 30 at the front end side and on which the pressure inside the combustion chamber C acts; a first electrode 50 that is provided between the diaphragm head 40 and the piezoelectric element 10; and a second electrode 55 that is arranged on an opposite side of the first electrode 50 with respect to the piezoelectric element 10.

Moreover, as shown in FIG. 5, the sensor part 100 includes: an insulating ring 60 made of alumina ceramic that electrically insulates the second electrode 55; a supporting member 65 that is provided at the rear end side relative to the insulating ring 60 and supports an end part of a later-described cover member 23 of the signal processor 200; and a coil spring 70 that is interposed between the second electrode 55 and a later-described conducting member 22.

The piezoelectric element 10, as an example of a detection member, has a piezoelectric body exhibiting a piezoelectric function having a piezoelectric longitudinal effect. The piezoelectric longitudinal effect indicates a function in which electric charges are generated on the surface of the piezoelectric body in an electric charge generation axis direction when external force acts on a stress application axis that is the same direction as the electric charge generation axis direction of the piezoelectric body. The piezoelectric element 10 according to the exemplary embodiment is contained inside the housing 30 so that the centerline direction corresponds to the direction of the stress application axis.

Next, a case in which a piezoelectric transversal effect is utilized for the piezoelectric element 10 is exemplified. The piezoelectric transversal effect indicates a function in which electric charges are generated on the surface of the piezoelectric body in the electric charge generation axis direction when external force acts on a stress application axis that is perpendicular to the electric charge generation axis of the piezoelectric body. A configuration in which plural piezoelectric bodies formed to be thin sheets are stacked can be accepted, electric charges generated on the piezoelectric bodies can be efficiently collected by stacking them as described above, and sensitivity of the sensor can be improved. As the piezoelectric body, langasite-based crystals (langasite, langatate, langanite, LGTA), quartz, gallium phosphate and the like having the piezoelectric longitudinal effect and the piezoelectric transversal effect can be exemplified. It should be noted that, in the piezoelectric element 10 in the exemplary embodiment, a langasite single crystal is used as the piezoelectric body.

Moreover, the piezoelectric element 10 may be configured by stacking plural piezoelectric bodies formed to be thin sheets. With this configuration, electric charges generated corresponding to the combustion pressure can be efficiently collected, and sensitivity in detection can be improved. Moreover, by stacking the plural sheets of the piezoelectric bodies to form an integrated block, immunity against great combustion pressure generated in the combustion chamber C of the internal combustion engine 1 is increased. It should be noted that the stacked piezoelectric bodies formed to be thin sheets form a rectangular parallelepiped with flat end faces from an outward appearance.

As shown in FIGS. 4 and 5, the housing 30 has a first housing 31 that is provided at a front end side, and a second housing 32 that is provided at a rear end side.

The first housing 31 is, as shown in FIG. 5, a thin-walled cylindrical component in which a cylindrical hole 310 is formed so that the diameter thereof is formed to be different in stages from the front end side to the rear end side. The hole 310 is configured with a first hole 311 and a second hole 312 with a hole diameter larger than a hole diameter of the first hole 311, which are formed in this order from the front end side toward the rear end side.

Moreover, the first housing 31 includes, at the outer side thereof, an end face 31a on which a portion for attaching the diaphragm head 41 is formed, a side face 31b constituting an outer peripheral surface and a protruding part 315 protruding from the side face 31b provided over the entire region in the peripheral direction. The protruding part 315 has, at the front end side, an inclined surface 315a, as an example of a shoulder part formed in a tapered state, which has a diameter gradually increasing from the front end side toward the rear end side, and, at the rear end side, a vertical surface 315b that is vertical to the centerline direction. Further, as shown in FIG. 3, in the exemplary embodiment, a step part 31bt, which is a groove formed over the entire region in the peripheral direction, is formed on the inclined surface 315a side of the side face 31b.

Figure 6A:
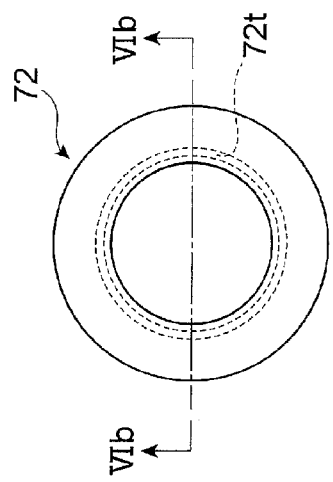
FIGS. 6A to 6C are diagrams for illustrating a second seal member in Exemplary embodiment 1.
Figure 6B:
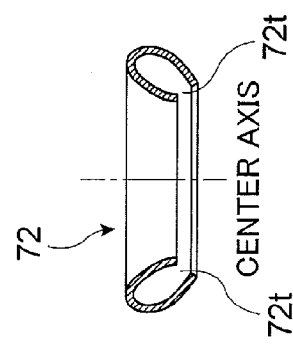
Figure 6C:
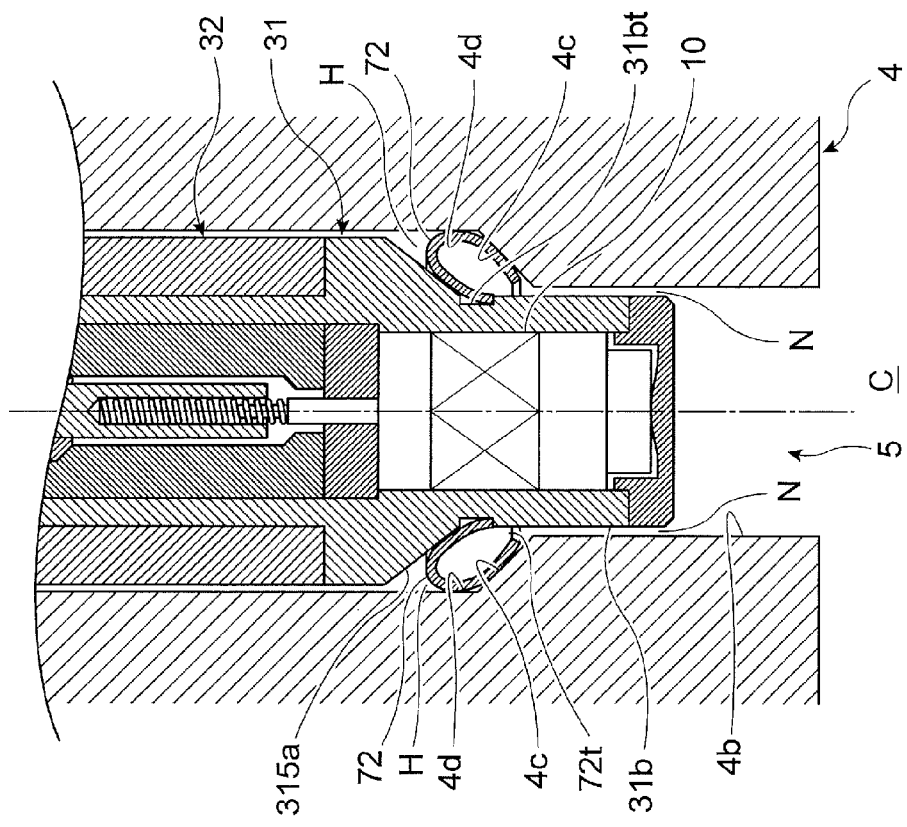

As shown in FIG. 6C to be described later, the inclined surface 315a forms a seal (enclosed) portion by interposing a later-described second seal member 72 between the cylinder head 4 and the inclined surface 315a. Specifically, in a state where the pressure detection device 5 is mounted to the cylinder head 4, a space capable of enclosing the second seal member 72 is formed between the inclined surface 315a and an inclined part 4c of the cylinder head 4. Then, between the cylinder head 4 and the pressure detection device 5, a holding part H, which is a space where the second seal member 72 is arranged, is formed by inner walls of the inclined part 4c and the second hole part 4d. The cross section of the holding part H in the exemplary embodiment is formed in a rhombus shape because the holding part H is configured with the inclined part 4c and the inclined surface 315a.

Moreover, the holding part H of the exemplary embodiment is provided at a position where the piezoelectric element 10 is provided in a center axis direction of the pressure detection device 5 (side).

As shown in FIG. 5, the vertical surface 315b forms a portion where the first housing 31 and the second housing 32 contact each other. Specifically, when the first housing 31 and the second housing 32 are connected, the vertical surface 315a of the first housing 31 corresponds to a vertical surface formed on a front end part of the second housing 32. Then, by bringing the vertical surface 315a of the first housing 31 into intimate contact with the front end part of the second housing 32, both of them are connected.

As shown in FIG. 6C to be described later, when the later-described second seal member 72 is attached to the pressure detection device 5, the step part 31bt forms a portion for holding the later-described second seal member 72 so that the second seal member 72 is not detached. Specifically, part of the later-described second seal member 72 is fitted into the step part 31bt. Then, in the exemplary embodiment, by attaching the second seal member 72 to the step part 31bt in advance, the second seal member 72 is unlikely to be mispositioned when the internal combustion engine 1 operates, or, workability in mounting or dismounting the pressure detection device 5 to or from the communication hole 4a of the cylinder head 4 is improved.

The second housing 32 is, as shown in FIG. 4, a tubular component in which a cylindrical hole 320 is formed so that the diameter thereof is formed to be different in stages from the front end side toward the rear end side, and the second housing 32 has an outer peripheral surface 330 with a diameter formed to be different in stages from the front end side toward the rear end side, at the outer side thereof.

The holes 320 are configured with a first hole 321, a second hole 322 with a hole diameter smaller than a hole diameter of the first hole 321, a third hole 323 with a hole diameter larger than the hole diameter of the second hole 322, a fourth hole 324 with a hole diameter larger than the hole diameter of the third hole 323, and a fifth hole 325 with a hole diameter larger than the hole diameter of the fourth hole 324, which have been formed from the front end side toward the rear end side in this order.

The hole diameter of the first hole 321 is set to be equal to or lower than the diameter of the outer peripheral surface of the first housing 31 so that the front end of the second housing 32 is tightly fitted with the rear end of the first housing 31 (by insertion with pressure).

The outer peripheral surface 330 is configured with a first outer peripheral surface 331, a second outer peripheral surface 332 with an outer diameter larger than an outer diameter of the first outer peripheral surface 331, a third outer peripheral surface 333 with an outer diameter larger than the outer diameter of the second outer peripheral surface 332, a fourth outer peripheral surface 334 with an outer diameter larger than the outer diameter of the third outer peripheral surface 333, and a fifth outer peripheral surface 335 with an outer diameter smaller than the outer diameter of the fourth outer peripheral surface 334. At the front end part of the second outer peripheral surface 332, a male screw 332a that is inserted into the female screw 4e of the cylinder head 4 is formed. A later-described first seal member 71 is loosely fitted over the third outer peripheral surface 333, and dimensional tolerance between the outer diameter of the third outer peripheral surface 333 and the inner diameter of the first seal member 71 is set at 0 to 0.2 mm, for example. The rear end part of the fourth outer peripheral surface 334 is formed to be a regular hexagonal cylinder having six chamfers at equal intervals in the peripheral direction. The section formed into the regular hexagonal cylinder is a section over which an industrial tool for fastening is fitted and to which rotation force applied to the industrial tool is transmitted when the pressure detection device 5 is fastened to the cylinder head 4. At the central part of the fifth outer peripheral surface 335 in the centerline direction, a concave part 335a that is concave from the outer peripheral surface is formed over the whole periphery.

Moreover, the second housing 32 is provided with an abutting face 340 on which the end face at a front end side of a later-described board covering part 232 of the cover member 23 of the signal processor 200 abuts, in a transition part for transitioning from the fourth hole 324 to the fifth hole 325 and at the front end of the fifth hole 325. In the abutting face 340, a pin insertion recessed part 340a into which a later-described second connecting pin 21b of a printed wiring board 210 of the signal processor 200 is inserted is formed.

Since the first housing 31 and the second housing 32 are located near the combustion chamber C as shown in FIG. 2, it is desirable to make them by using a material withstanding a used temperature environment of −40° C. to 350° C. at least. Specifically, it is desirable to use a high heat-resistant stainless steel such as SUS 630, SUS 316 and SUS 430 of the JIS standard, for example.

As shown in FIG. 5, the diaphragm head 40 has a cylindrical part 41 formed into a cylinder, and an inner part 42 formed inside the cylindrical part 41.

The rear end part of the cylindrical part 41 is tightly fitted into the front end part of the first housing 31 of the housing 30 (by insertion with pressure), and an entering part 41a that enters the inside of the front end part and an abutting face 41b which is formed into the same shape as an end face 31a of the front end part and on which the end face 31a abuts at the fitting are provided.

The inner part 42 is a disk-shaped component provided to cover an opening at the front end side of the cylindrical part 41, and a protruding part 42a protruding toward the piezoelectric element 10 from the rear end side surface is provided at the central part of the rear end side surface.

Since the diaphragm head 40 is located in the combustion chamber C with high temperature and high pressure, the material of the diaphragm head 40 is desired to be an alloy that has high elasticity and is excellent in durability, heat resistance, corrosion resistance and the like, and an example thereof is SUH 660.

The first electrode 50 is a cylindrical component in which the diameter is formed to be different in stages from the front end side toward the rear end side, and is configured with a first cylinder part 51 and a second cylinder part 52 with an outer diameter larger than an outer diameter of the first cylinder part 51. The outer diameter of the first cylinder part 51 is smaller than the inner diameter of the entering part 41a of the diaphragm head 40, and the outer diameter of the second cylinder part 52 is approximately the same as the hole diameter of the first hole 311 of the first housing 31. Then, the end face at the front end side of the first cylinder part 51 is arranged to be in contact with the protruding part 42a of the inner part 42 of the diaphragm head 40, and the end face at the rear end side of the second cylinder part 52 is arranged to be in contact with the front end-side face of the piezoelectric element 10. By the contact between the outer peripheral surface of the second cylinder part 52 and the inner peripheral surface of the first housing 31 and/or the contact between the end face at the front end side of the first cylinder part 51 and the diaphragm head 40, the front end part of the piezoelectric element 10 is electrically connected with the housing 30.

The first electrode 50 is used for applying the pressure inside the combustion chamber C to the piezoelectric element 10, and is formed to have a size that allows the end face at the rear end side of the second cylinder part 52 as the end face at the piezoelectric element 10 side to push the whole surface of the end face of the piezoelectric element 10. Moreover, both end faces of the first electrode 50 in the centerline direction are formed to be parallel to each other (perpendicular to the centerline direction) and have smooth surfaces so that the pressure received from the diaphragm head 40 can equally act on the piezoelectric element 10.

As a material of the first electrode 50, stainless steel is exemplified.

The second electrode 55 is a cylindrical component, and an end face at the front end side is arranged to be in contact with the end face at the rear end side of the piezoelectric element 10, and an end face at the other end part side is arranged to be in contact with the insulating ring 60. At the end face at the rear end side of the second electrode 55, a cylindrical protruding part 55a protruding from this end face toward the rear end side is provided. The protruding part 55a has a base end part at the end face side, and a tip part having the outer diameter smaller than the outer diameter of the base end part. The outer diameter of the protruding part 55a is set to be smaller than the inner diameter of the insulating ring 60 and the length of the protruding part 55a is set to be longer than the width (length in the centerline direction) of the insulating ring 60, so that the tip of the protruding part 55a is exposed from the insulating ring 60. The second electrode 55 is a component for applying a certain load to the piezoelectric element 10 between the second electrode 55 and the first electrode 50, and the end face at the piezoelectric element 10 side is formed to have a size that allows the end face to push the whole surface of the end face of the piezoelectric element 10, and is formed to be parallel to the end face of the piezoelectric element 10 and have a smooth surface. The outer diameter of the second electrode 55 is set to be smaller than the hole diameter of the second hole 312 of the first housing 31, and there is a space between the outer peripheral surface of the second electrode 55 and the inner peripheral surface of the first housing 31.

As a material of the second electrode 55, stainless steel is exemplified.

The insulating ring 60 is a cylindrical component formed of alumina ceramics or the like, the inner diameter (hole diameter at the central part) is set to be slightly larger than the outer diameter of the base end part of the protruding part 55a of the second electrode 55, and the outer diameter is set to be approximately the same as the hole diameter of the second hole 312 of the first housing 31. By arranging the second electrode 55 so that the protruding part 55a is inserted into the hole at the central part of the insulating ring 60, the second electrode 55 is arranged so that the center position corresponds to the center of the second hole 312 of the first housing 31.

The supporting member 65 is a tubular component that has a single outer peripheral surface, and has plural cylindrical holes 650 with different diameters in the inside thereof from the front end side toward the rear end side.

The holes 650 are configured with a first hole 651, a second hole 652 with a hole diameter larger than a hole diameter of the first hole 651, and a third hole 653 with a hole diameter larger than the hole diameter of the second hole 652, which are formed in this order from the front end side toward the rear end side. The hole diameter of the first hole 651 is larger than the outer diameter of the base end part of the protruding part 55a of the second electrode 55, and the protruding part 55a is exposed to the inside of the supporting member 65. The hole diameter of the second hole 652 is larger than the outer diameter of the front end of the later-described conducting member 22 of the signal processor 200. The hole diameter of the third hole 653 is smaller than the outer diameter of the end part of the later-described cover member 23 of the signal processor 200, and the cover member 23 is tightly fitted over a peripheral wall forming the third hole 653. Thereby, the supporting member 65 functions as a component supporting the end part of the cover member 23.

The coil spring 70 has the inner diameter not smaller than the outer diameter of the tip part of the protruding part 55a of the second electrode 55 and smaller than the outer diameter of the base end part, and the outer diameter smaller than a diameter of an insertion hole 22a of the later-described conducting member 22. While the tip part of the protruding part 55a of the second electrode 55 is inserted into the inner side of the coil spring 70, the coil spring 70 is inserted into the insertion hole 22a of the later-described conducting member 22. The length of the coil spring 70 is set at length that allows the coil spring 70 to be interposed between the second electrode 55 and the conducting member 22 in a compression state. As a material of the coil spring 70, an alloy that has high elasticity and is excellent in durability, heat resistance, corrosion resistance and the like is preferably used. Moreover, it is preferable to increase electric conduction by plating the surface of the coil spring 70 with gold.

Next, description will be given of the signal processor 200.

The signal processor 200 includes, as shown in FIG. 3: a circuit board part 21 that performs at least amplification processing on an electric signal as slight electric charges obtained from the piezoelectric element 10 of the sensor part 100; the conducting member 22 that guides the electric charges generated on the piezoelectric element 10 to the circuit board part 21 and is formed into a rod-like shape; the cover member 23 that covers the circuit board part 21, the conducting member 22 and the like; and an O-ring 24 that seals the circuit board part 21 and the like.

As shown in FIG. 4, the circuit board part 21 has the printed wiring board 210 on which an electronic component and the like configuring a circuit for amplifying the slight electric charges obtained from the piezoelectric element 10 of the sensor part 100 are mounted. To the front end part of the printed wiring board 210, a first connecting pin 21a for electrical connection with the rear end part of the conducting member 22 and the second connecting pin 21b for ground connection and positioning are connected by solder or the like. Moreover, to the rear end part of the printed wiring board 210, three third connecting pins 21c electrically connected with the controller 6 through a connector 8a at the front end part of the transmission cable 8 are connected by solder or the like. Each of the three third connecting pins 21c is used for supply of a power-supply voltage and supply of a GND voltage from the controller 6 to the printed wiring board 210 and supply of an output voltage from the printed wiring board 210 to the controller 6.

As shown in FIGS. 3, 4 and 5A to 5C, the conducting member 22 is a rod-shaped (cylindrical) component, and the insertion hole 22a into which the tip part of the protruding part 55a of the second electrode 55 is inserted is formed at the front end part. The rear end part of the conducting member 22 is electrically connected to the printed wiring board 210 of the circuit board part 21 through a conductor wire. As a material of the conducting member 22, brass, beryllium copper and the like are exemplified. In this case, brass is desirable from a viewpoint of workability and cost. In contrast thereto, beryllium copper is desirable from a viewpoint of electric conductivity, strength at high temperature and reliability.

As shown in FIG. 4, the cover member 23 has: a conducting member covering part 231 that covers the outer periphery of the conducting member 22; the board covering part 232 that covers a side face and a bottom face of the printed wiring board 210 of the circuit board part 21; and a connector part 233 which covers a periphery of the third connecting pins 21c connected to the printed wiring board 210 and into which the connector 8a at the front end part of the transmission cable 8 is fitted.

The conducting member covering part 231 covers the conducting member 22 so as to expose the front end part of the conducting member 22 in the centerline direction, and is provided with an outer peripheral surface 240 with a diameter formed to be different in stages from the front end side toward the rear end side. The outer peripheral surface 240 is configured with a first outer peripheral surface 241, a second outer peripheral surface 242 with an outer diameter larger than an outer diameter of the first outer peripheral surface 241, a third outer peripheral surface 243 with an outer diameter larger than the outer diameter of the second outer peripheral surface 242, and a fourth outer peripheral surface 244 with an outer diameter larger than the outer diameter of the third outer peripheral surface 243.

The diameter of the first outer peripheral surface 241 is larger than the hole diameter of the third hole 653 of the supporting member 65, and the front end part of the conducting member covering part 231 is tightly fitted into the peripheral wall forming the third hole 653 of the supporting member 65 (by insertion with pressure).

The diameter of the second outer peripheral surface 242 is formed to be smaller than the hole diameter of the second hole 322 of the second housing 32, and the diameter of the third outer peripheral surface 243 is formed to be smaller than the hole diameter of the third hole 323 of the second housing 32. Moreover, the diameter of the fourth outer peripheral surface 244 is larger than the hole diameter of the fourth hole 324 of the second housing 32, and the rear end part of the conducting member covering part 231 is tightly fitted into a peripheral wall forming the fourth hole 324 of the second housing 32 (by insertion with pressure). Thereby, since at least the respective both end parts of the conducting member covering part 231 in the centerline direction are supported by being in contact with the supporting member 65 and the second housing 32, it is possible to suppress an adverse effect on the conducting member 22 even in a bad vibration environment, and it is possible to avoid breaking of connections, bad connection and the like in the conducting member 22 due to the vibration.

The board covering part 232 is basically a cylindrical section, and a rectangular opening 232a for installing the printed wiring board 210 in the inside is provided at the side surface thereof. Moreover, a ring groove 232b for the O-ring 24 for sealing the inside of the housing 30 and the installation part of the printed wiring board 210 is formed at the rear end side of the board covering part 232.

The connector part 233 is a thin-walled section that protrudes from an end face 232c at the rear end side of the board covering part 232 and is formed to cover the periphery of the three third connecting pins 21c connected to the printed wiring board 210. The rear end part of the connector part 233 is opened, and it is possible to receive the connector 8a provided at the front end part of the transmission cable 8 at the inside thereof. Moreover, at the rear end side of the connector part 233, a hole 233a communicating the inside and the outside with each other is formed, and by putting a hook provided on the connector 8a of the transmission cable 8 into this hole 233a, separation of the connector 8a of the transmission cable 8 from the connector part 233 is suppressed.

The covering member 23 configured as described above is formed of a material having an insulation property such as a resin. Moreover, the cover member 23 is integrally formed with the conducting member 22, the first connecting pin 21a, the second connecting pin 21b and the three third connecting pins 21c. More specifically, the cover member 23 is formed by putting a heated resin into a mold in which the conducting member 22, the first connecting pin 21a, the second connecting pin 21b and the three third connecting pins 21c have been set.

For unitizing the signal processor 200, the printed wiring board 210 of the circuit board part 21 is inserted from the opening 232a of the cover member 23 that has been formed, and the printed wiring board 210 is installed at the central part of the board covering part 232. When the printed wiring board 210 is installed, tip ends of the first connecting pin 21a, the second connecting pin 21b and the three third connecting pins 21c are passed through through-holes penetrating in a thickness direction and are soldered. Then, the first connecting pin 21a and the conducting member 22 are connected with each other by using a conducting wire. Moreover, the O-ring 24 is mounted on the ring groove 232b of the board covering part 232 of the cover member 23. The O-ring 24 is a well-known O-shaped ring formed of a fluorine-based rubber.

Next, description will be given of the holding member 300. The holding member 300 is, as shown in FIG. 3, a thin-walled cylindrical component, and is provided with, at the rear end part, a protruding part 300a protruding inward from the inner peripheral surface. After the holding member 300 is mounted on the second housing 32, a section corresponding to the concave part 335a provided on the fifth outer peripheral surface 335 is pressurized from the outside and thereby swaged. Thereby, the holding member 300 is difficult to move with respect to the housing 30, and movement of the signal processor 200 with respect to the housing 30 is suppressed.

The pressure detection device 5 configured as described above is assembled as described below.

First, as shown in FIG. 5, the first housing 31 and the diaphragm head 40 are fitted with each other (by insertion with pressure) until the end face 31a of the first housing 31 and the abutting face 41b of the diaphragm head 40 come into contact with each other. Then, a contact section between the end face 31a of the first housing 31 and the abutting face 41b of the diaphragm head 40 is irradiated with a laser beam from a direction intersecting the centerline direction (for example, a direction perpendicular to the centerline direction), and thereby the first housing 31 and the diaphragm head 40 are welded.

Thereafter, the first electrode 50 and the piezoelectric element 10 are inserted from the opening at the rear end side of the first housing 31. Then, a component including the coil spring 70 having been mounted on the tip part of the protruding part 55a of the second electrode 55 and the insulating ring 60 having been fitted over the protruding part 55a of the second electrode 55 is inserted from the opening at the rear end side of the first housing 31. Subsequently, the supporting member 65 is inserted from the opening at the rear end side of the first housing 31.

Thereafter, in order to enhance sensitivity and linearity of the piezoelectric element 10, a predetermined load (preload) is applied on the piezoelectric element 10 in the first housing 31. In other words, the supporting member 65 is pressurized from the rear end side toward the front end side in the centerline direction with an exclusive jig mounted on the rear end part of the supporting member 65. The supporting member 65 is continued to be pressurized until a displacement amount of the end face at the front end side of the inner part 42 of the diaphragm head 40 in the centerline direction becomes a predetermined length as compared with that before the supporting member 65 is pressurized. When the end face at the front end side of the inner part 42 of the diaphragm head 40 is displaced by the predetermined length, the supporting member 65 and the first housing 31 are fixed. As a fixing method, laser beam irradiation from a direction intersecting the centerline direction (for example, the direction perpendicular to the centerline direction) is exemplified. The laser beam may be emitted to the whole circumference in the circumferential direction, or may be emitted in spots at equal intervals in the circumferential direction. After fixing the supporting member 65 and the first housing 31, the aforementioned exclusive jig is detached. Thereby, the state in which the preload acts on the piezoelectric element 10 in the first housing 31 is established.

It should be noted that, in the pressure detection device 5 to which the exemplary embodiment is applied, the state in which the preload is acting is assumed as a zero state that serves as a standard for pressure detection.

Thereafter, the first housing 31 and the second housing 32 are fitted with each other (by insertion with pressure) until the vertical surface 315b of the protruding part 315 of the first housing 31 and the end face at the front end side of the second housing 32 come into contact with each other. Then, a contact section between the vertical surface 315b of the first housing 31 and the end face of the second housing 32 is irradiated with a laser beam from a direction intersecting the centerline direction (for example, the direction perpendicular to the centerline direction), and the first housing 31 and the second housing 32 are welded.

Thereafter, as shown in FIG. 3, the signal processor 200 is inserted from the opening at the rear end side of the second housing 32 until the end face at the front end side of the board covering part 232 of the cover member 23 of the signal processor 200 abuts on the abutting face 340 of the second housing 32. At this time, as shown in FIG. 4, the signal processor 200 is inserted so that the coil spring 70 mounted on the protruding part 55a of the second electrode 55 enters the insertion hole 22a of the conducting member 22 of the signal processor 200 and the second connecting pin 21b connected to the printed wiring board 210 enters the pin insertion recessed part 340a formed on the abutting face 340 of the second housing 32.

Thereafter, as shown in FIG. 4, the holding member 300 is fitted over the signal processor 200 from the rear end side until the protruding part 300a of the holding member 300 abuts on the end face 232c of the board covering part 232 of the signal processor 200. By pressurizing a section of the holding member 300 corresponding to the concave part 335a of the fifth outer peripheral surface 335 of the second housing 32 in the state where the end face 232c of the signal processor 200 and the protruding part 300a of the holding member 300 are in contact with each other, the holding member 300 is swaged onto the second housing 32. Thereby, the holding member 300 is difficult to move with respect to the housing 30, and the signal processor 200 is difficult to move with respect to the housing 30.

The pressure detection device 5 is assembled as described above.

Here, description will be given of an electrical connecting structure in the aforementioned pressure detection device 5.

First, as shown in FIG. 5, the end face at the front end side of the piezoelectric element 10 is electrically connected with the housing 30 made of metal through the first electrode 50 and the diaphragm head 40 which are made of metal.

In contrast, the end face at the rear end side of the piezoelectric element 10 is electrically connected with the second electrode 55 made of metal, and the second electrode 55 is electrically connected with the coil spring 70 made of metal through the protruding part 55a. Moreover, the coil spring 70 is electrically connected with the conducting member 22 made of metal, and the conducting member 22 is electrically connected with the printed wiring board 210. On the other hand, the outer diameter of the protruding part 55a of the second electrode 55 is smaller than the hole diameter of the first hole 651 of the supporting member 65, and the outer diameter of the front end part of the conducting member 22 is smaller than the hole diameter of the second hole 652 of the supporting member 65. That is, the second electrode 55, the coil spring 70 and the conducting member 22 are not electrically connected with the supporting member 65. Thus, a transmission route of a charge signal from the second electrode 55 to the printed wiring board 210 through the coil spring 70 and the conducting member 22 is electrically insulated from the housing 30 made of metal by the insulating ring 60 and the cover member 23 each of which is formed of an insulating body.

When the pressure detection device 5 configured as described above is mounted to the cylinder head 4, as shown in FIG. 2, the diaphragm head 40 side of the sensor part 100 is firstly inserted into the communication hole 4a formed in the cylinder head 4, and the male screw 332a formed on the second housing 32 of the housing 30 is screwed into the female screw 4e formed on the communication hole 4a of the cylinder head 4.

By mounting the pressure detection device 5 on the cylinder head 4, the housing 30 is electrically connected with the cylinder head 4 made of metal. Since the cylinder head 4 is in an electrically-grounded state, as shown in FIG. 4, the front end part of the piezoelectric element 10 is grounded through the housing 30 in the pressure detection device 5. Here, in this specific example, although a configuration in which the side surface of the piezoelectric element 10 and the inner wall surface of the housing 30 can be brought into contact with each other is employed, particular problems do not occur since the piezoelectric element 10 has a remarkably large resistance value because it is configured of an insulating body and electric charges to be generated in accordance with pressure change are generated at both end parts of the piezoelectric element 10 in the centerline direction.

When the combustion engine 1 shown in FIG. 1 is actuated, combustion pressure is applied on the inner part 42 of the diaphragm head 40 of the sensor part 100, as shown in FIGS. 4 and 5. The combustion pressure applied on the diaphragm head 40 acts on the piezoelectric element 10 sandwiched between the first electrode 50 and the second electrode 55, and thereby electric charges corresponding to the combustion pressure is generated on the piezoelectric element 10. Then, the electric charges generated on the piezoelectric element 10 are applied to the circuit board part 21 through the second electrode 55, the coil spring 70 and the conducting member 22. After performing the amplification operation on the electric charges applied to the circuit board part 21 in the circuit board part 21, a voltage corresponding to the resultant electric charges is supplied to the controller 6 through the third connecting pins 21c connected to the circuit board part 21 and the transmission cable 8 shown in FIG. 1.

Next, description will be given of the seal part 7.

As shown in FIG. 2, the seal part 7 has the first seal member 71 that is arranged between an end face 4f of a peripheral wall forming the communication hole 4a of the cylinder head 4 in a fastening direction of the pressure detection device 5 and the end face 334a at the front end side of the cylindrical section where the fourth outer peripheral surface 334 of the housing 30 of the pressure detection device 5 is provided, and seals a space between the cylinder head 4 and the pressure detection device 5.

Moreover, as shown in later-described FIG. 6C, the seal part 7 has the second seal member 72 that is arranged in the holding part H formed by the step part 31bt and the inclined surface 315a of the first housing 31 and the end face 4f and the inclined part 4c of the communication hole 4a, and seals a space between the cylinder head 4 and the pressure detection device 5.

An example of the first seal member 71 shown in FIG. 2 is a metal gasket formed by punching a metal plate made of copper, stainless steel, aluminum or the like. The cross-sectional shape thereof is preferably formed to be an S-shape, or a rectangular-like shape. When the pressure detection device 5 is fastened to the cylinder head 4, the first seal member 71 deforms by receiving force in the fastening direction so that the length in the fastening direction is shortened, and increases airtightness inside the combustion chamber C. In other words, by screwing the pressure detection device 5 into the cylinder head 4, contact pressure generated between the first seal member 71 and the cylinder head 4 and contact pressure generated between the first seal member 71 and the housing 30 of the pressure detection device 5 are increased. Thereby, leakage of combustion gas from between the first seal member 71 and the cylinder head 4 and between the first seal member 71 and the housing 30 of the pressure detection device 5 is suppressed.

FIGS. 6A to 6C are diagrams for illustrating the second seal member 72 in Exemplary embodiment 1.

FIG. 6A shows an overall view of the second seal member 72, FIG. 6B shows a VIb-VIb cross section shown in FIG. 6A, and FIG. 6C shows a state in which the second seal member 72 is provided between the pressure detection device 5 and the cylinder head 4.

The second seal member 72 is a component that suppresses inflow of the combustion gas into the gap between the inner wall of the cylinder head 4 and the outer wall of the housing 30 of the pressure detection device 5. The second seal member 72 is, as shown in FIG. 6C, arranged in the holding part H. The holding part H of the exemplary embodiment is formed at a position of the piezoelectric element 10 in a center axis direction of the housing 30 (side). Accordingly, the second seal member 72 suppresses inflow of the combustion gas into the rear end side in the center axis direction relative to the position where the piezoelectric element 10 is provided between the cylinder head 4 and the pressure detection device 5.

As shown in FIG. 6A, the second seal member 72 is an annular (ring-shaped) component and is formed to have a hollow interior. Further, the second seal member 72 has an opening part 72t, which is an annular incision formed over an entire periphery on one end side in the center axis direction.

The inner diameter of the second seal member 72 is, in the state of before being mounted, set slightly smaller than the outer diameter of the side face 31b (in the exemplary embodiment, the outer diameter of the step part 31bt) of the first housing 31 of the pressure detection device 5. Moreover, the outer diameter of the second seal member 72 is set slightly larger than the inner diameter of the second hole part 4d in the communication hole 4a of the cylinder head 4.

When the second seal member 72 is mounted to the internal combustion engine 1, an inner peripheral part of the second seal member 72 comes into intimate contact with the outer periphery of the first housing 31, and an outer peripheral part thereof comes into intimate contact with the inner periphery of the second hole part 4d.

Moreover, the cross section of the second seal member 72 has, as shown in FIG. 6B, an opening shape because the opening part 72t is provided. The opening part 72t is, as shown in FIG. 6B, provided at one end part in the center axis direction. Moreover, the opening part 72t is formed to be inclined with respect to the center axis. In the exemplary embodiment, in the holding part H, a gap N between the side face 31b and the first hole part 4b is positioned on the center axis side and on the combustion chamber C side. Then, the opening part 72t is inclined with respect to the center axis so that the opening part 72t faces toward the gap N.

Further, the cross section of the second seal member 72 has a horseshoe shape in the case of being cut in the center axis direction. As shown in FIG. 6C, the holding part H, in which the second seal member 72 is arranged, has a rhombus shape.

Then, in the exemplary embodiment, the second seal member 72 is formed in the horseshoe shape so as to follow the cross-sectional shape of the holding part H, to thereby increase intimate contact property with the holding part H.

Then, the thickness of a material of the second seal member 72 is set to an extent capable of deforming when the second seal member 72 is mounted to the first housing 31, or, when the combustion gas flows from the opening part 72t into the inside. Moreover, by configuring the second seal member 72 deformable, when the pressure detection device 5 is mounted to the cylinder head 4, for example, it becomes possible for the second seal member 72 to absorb a dimensional error in the center axis direction.

Moreover, as the material of the second seal member 72 in the exemplary embodiment, a metal such as copper, stainless steel, aluminum and the like can be used. In addition, as the material of the second seal member 72 in the exemplary embodiment, Tefron (Japanese registered trademark) and the like can be used.

Then, as shown in FIG. 6C, the second seal member 72 is arranged in the holding part H in the state in which the pressure detection device 5 is mounted to the cylinder head 4. Moreover, in the exemplary embodiment, the second seal member 72 is held by the first housing 31 in such a way that a part on the inner side thereof is fitted into the step part 31bt. The opening part 72t of the second seal member 72 faces the gap N that extends to the combustion chamber C. Accordingly, the second seal member 72 is provided in a state in which the opening part 72t is opened toward the combustion chamber C.

Subsequently, as shown in FIGS. 1 and 2, description will be given of operations of the sensor part 100 of the pressure detection device 5 in the internal combustion engine 1.

In the internal combustion engine 1 configured as described above, in a pressure state in which pressure in the combustion chamber C is of the order of atmospheric pressure and is negligibly small, for example, as when the combustion pressure is not generated (in the initial state), the diaphragm head 40 is seldom deformed. Then, in this state, the piezoelectric element 10 is in a state where a load corresponding to the atmospheric pressure and a preload applied in assembling the pressure detection device 5 act thereon. In the exemplary embodiment, the state where only the preload is acting is assumed as the state where the pressure is zero.

Then, for example, in the internal combustion engine 1, after a fuel and air are fed into the combustion chamber C, ignition is carried out by a spark plug, and accordingly, the combustion pressure is generated in the combustion chamber C. Then, as shown in FIG. 4, upon receiving pressure via the diaphragm head 40, the first electrode part 50 applies a load in the centerline direction onto the piezoelectric element 10. The piezoelectric element 10 receives a compressive force from the first electrode part 50, and is thereby subjected to compressive deformation. Then, charges generated by compressive deformation of the piezoelectric element 10 are transmitted to the signal processor 200 as an electric signal.

Here, the combustion gas generated by combustion in the combustion chamber C enters the gap N as shown in FIG. 6C. Then, the combustion gas having entered the gap N reaches the second seal member 72. The combustion gas intrudes into the inside of the opening part 72t of the second seal member 72, to thereby expand the second seal member 72. Then, the outer periphery part of the second seal member 72 is brought into intimate contact with the side face 31b (the step part 31bt) and the inclined surface 315a of the first housing 31, and with the second hole part 4d and the inclined part 4c of the cylinder head 4.

In the exemplary embodiment, the second seal member 72 is attached to be in contact with the inclined surface 315a of the first housing 31 constituting the holding part H. Consequently, in a case where the second seal member 72 is pushed by the combustion gas in the axial direction from the front end side to the rear end side of the center axis direction of the pressure detection device 5, it is possible to hold the second seal member 72 by the inclined surface 315a having a surface component in the axial direction. The more the second seal member 72 is pushed toward the rear end side in the center axis direction, the more the degree of intimate contact increases by reaction from the inclined surface 315a. Then, it is possible to suppress inflow of the combustion gas into the gap on the rear end side of the second seal member 72.

Moreover, the inclined surface 315a of the first housing 31 has a tapered shape in which the outer diameter gradually increases from the front end side toward the rear end side. This makes it possible to configure the second seal member 72 to be easily arranged with the opening part 72t facing toward the gap N. Accordingly, in comparison with a case in which, for example, the opening part 72t of the second seal member 72 faces in the direction perpendicular to the center axis direction of the pressure detection device 5, it is possible to cause the combustion gas flowing in the center axis direction of the pressure detection device 5 to be easily guided to the inside of the opening part 72t.

As shown in FIGS. 1 and 2, when the pressure detection device 5 in a state of low temperature is exposed to the combustion gas, such as immediately after the internal combustion engine 1 starts combustion, the temperature of the housing 30 provided on the outer side of the pressure detection device 5 sharply increases. Then, on the front end side closer to the combustion chamber C of the pressure detection device 5, in response to the temperature rise, the temperatures inside and outside of the housing 30 are likely to increase in a short time. Accordingly, on the front end side closer to the combustion chamber C of the pressure detection device 5, difference in thermal expansion between the housing 30 provided on the outer side and the components inside the housing 30 is rarely generated.

On the other hand, on a side far from the front end side (the combustion chamber C side) of the pressure detection device 5, temperature of the components inside the housing 30 hardly increases. Accordingly, on the far side from the combustion chamber C of the pressure detection device 5, difference in thermal expansion between the housing 30 provided on the outer side and the components inside the housing 30 is apt to be large. As a result, since the thermal expansion amount of the inside components becomes small and the thermal expansion amount of the housing 30 that is provided on the outer side becomes relatively large, there is a possibility that, for example, a gap is generated between the piezoelectric element 10 and the second electrode part 55. Then, in the pressure detection device 5, there is a fear of occurrence of a state in which precise detection of actual pressure is impossible, and therefore, a detection error occurs.

In contrast, in the internal combustion engine 1 to which the exemplary embodiment is applied, by suppressing inflow of the combustion gas into the gap on the rear end side of the second seal member 72, occurrence of sharp temperature rise only at the housing 30 on the outer side is prevented on the far side from the combustion chamber C of the pressure detection device 5. Accordingly, in the internal combustion engine 1 in the exemplary embodiment, occurrence of error in pressure detection due to thermal expansion is suppressed.

Moreover, in the pressure detection device 5 to which the exemplary embodiment is applied, the piezoelectric element 10 is provided on the front end side of the pressure detection device 5, to thereby arrange the piezoelectric element 10 closer to the combustion chamber C, and thereby detection accuracy of combustion pressure in the combustion chamber C is increased. In addition, in the exemplary embodiment, the holding part H is formed in the vicinity (side) of the piezoelectric element 10, and the second seal member 72 is provided in the holding part H. Then, in the exemplary embodiment, inflow of the combustion gas into the rear end side in the center axis direction relative to the position where the piezoelectric element 10 is provided is suppressed. In this manner, in the pressure detection device 5 in the exemplary embodiment, while pressure detection is performed with high accuracy by arranging the piezoelectric element 10 closer to the combustion chamber C, occurrence of error in pressure detection due to thermal expansion of the housing 30 is suppressed.

Exemplary Embodiment 2

Subsequently, the internal combustion engine 1 according to Exemplary embodiment 2 will be described. It should be noted that components similar to those of the internal combustion engine 1 according to Exemplary embodiment 1 are assigned with the same reference signs, and detailed descriptions thereof will be omitted.

FIGS. 7A to 7C are diagrams for illustrating the internal combustion engine 1 according to Exemplary embodiment 2.

FIG. 7A shows an overall view of the second seal member 272, FIG. 7B shows a VIIb-VIIb cross section shown in FIG. 7A, and FIG. 7C shows a state in which the second seal member 272 is provided between the pressure detection device 5 and the cylinder head 4.

As shown in FIG. 7C, the communication hole 4a of the cylinder head 4 in Exemplary embodiment 2 includes, from the combustion chamber C side, the first hole part 4b, the second hole part 4d having a hole diameter larger than the hole diameter of the first hole part 4b and a step part 4e that is provided between the first hole part 4b and the second hole part 4d and forms a step vertical to the center axis direction.

Then, the internal combustion engine 1 according to Exemplary embodiment 2 has the second seal member 272 that seals a space between the cylinder head 4 and the pressure detection device 5.

In the internal combustion engine 1 according to Exemplary embodiment 2, as shown in FIG. 7C, in a state where the pressure detection device 5 is mounted on the cylinder head 4, a distance is provided between the inclined surface 315a of the pressure detection device 5 and the step part 4e of the cylinder head 4 so that the second seal member 272 can be sandwiched therebetween. Then, in the internal combustion engine 1 according to Exemplary embodiment 2, the holding part H for holding the second seal member 272 of Exemplary embodiment 2 is formed by the second vertical surface 315c and the side face 31b (the step part 31bt) and by the second hole part 4d and the step part 4e. In Exemplary embodiment 2, as shown in FIG. 7C, the cross section of the holding part H has a triangular shape.

The second seal member 272 is a component that suppresses inflow of the combustion gas into the gap between the inner wall of the cylinder head 4 and the outer wall of the housing 30 of the pressure detection device 5. The second seal member 272 is, as shown in FIG. 7C, arranged in the holding part H. The holding part H of Exemplary embodiment 2 is formed at a position where the piezoelectric element 10 of the housing 30 is provided. Accordingly, the second seal member 272 in Exemplary embodiment 2 suppresses inflow of the combustion gas into the rear end side in the center axis direction relative to the position where the piezoelectric element 10 is provided at the gap between the cylinder head 4 and the pressure detection device 5.

As shown in FIG. 7A, the second seal member 272 is an annular component. Moreover, the cross section of the second seal member 272 has, as shown in FIG. 7B, a wedge shape. The second seal member 272 includes an outer peripheral part 272o that is a surface provided on the outer periphery side and an inner peripheral part 272i that is a surface provided on the inner periphery side. Then, in the second seal member 272, the outer peripheral part 272o and the inner peripheral part 272i are connected over an entire periphery on one end side indicated in the upper side in the figure. Moreover, in the second seal member 272, the outer peripheral part 272o and the inner peripheral part 272i are separated to form an opening part 272t on the other end side indicated in the lower side in the figure. In this manner, the cross section of the second seal member 272 in Exemplary embodiment 2 has an aperture shape.

The outer peripheral part 272o is, in a state where the second seal member 272 is attached to the internal combustion engine 1, formed substantially in parallel with the second hole part 4d in the communication hole 4a of the cylinder head 4. Moreover, the inner peripheral part 272i is, in a state where the second seal member 272 is attached to the internal combustion engine 1, formed substantially in parallel with the inclined surface 315a of the first housing 31.

As shown in FIG. 7C, the holding part H, in which the second seal member 272 is arranged, has a triangular shape. Then, in the exemplary embodiment, the second seal member 272 is formed so that the cross section thereof has the wedge shape so as to follow the holding part H having the triangular-shaped cross section, to thereby increase intimate contact property of the second seal member 272 with the holding part H.

Moreover, in a state prior to attaching the second seal member 272 to the internal combustion engine 1, the angle formed by the outer peripheral part 272o and the inner peripheral part 272i of the second seal member 272 is set slightly larger than the angle formed by the second hole part 4d of the communication hole 4a and the inclined surface 315a of the first housing 31.

Then, when the second seal member 272 is mounted to the internal combustion engine 1, an inner peripheral part 272i comes into intimate contact with the inclined surface 315a of the first housing 31. Further, when the second seal member 272 is mounted to the first housing 31 and when the pressure detection device 5 is mounted into the communication hole 4a of the cylinder head 4, the outer peripheral part 272o comes into intimate contact with the inner periphery.

The opening part 272t of the second seal part 272 is, as shown in FIG. 7B, provided at one end part in the center axis direction. Moreover, in the exemplary embodiment, when the second seal member 272 is arranged in the holding part H, the gap N between the side face 31b and the first hole part 4b is positioned on the center axis side and on the combustion chamber C side in the holding part H. Then, the opening part 272t is inclined with respect to the center axis so that the opening part 272t faces toward the gap N.

Moreover, the thickness of a material of the second seal member 272 is set to an extent capable of deforming when the second seal member 272 is mounted to the first housing 31, or, when the combustion gas flows from the opening part 272t into the inside.

It should be noted that, as the material of the second seal member 272 in the exemplary embodiment, a metal such as copper, stainless steel, aluminum and the like can be used. In addition, as the material of the second seal member 272 in the exemplary embodiment, Tefron (Japanese registered trademark) and the like can be used.

Then, as shown in FIG. 7C, the second seal member 272 is arranged in the holding part H in the state in which the pressure detection device 5 is mounted to the cylinder head 4. Moreover, in the exemplary embodiment, the second seal member 272 is held by the first housing 31 in such a way that a part on the inner peripheral part 272i side thereof is fitted into the step part 31bt. Then, the second seal part 272 is mounted so that the opening part 272t faces toward the gap N that extends to the combustion chamber C. Accordingly, the second seal member 272 is provided in a state in which the opening part 272t is opened toward the combustion chamber C.

When the internal combustion engine 1 is operated, the combustion gas generated by combustion in the combustion chamber C enters the gap N as shown in FIG. 7B. Then, the combustion gas having entered the gap N reaches the second seal member 272. Further, the combustion gas intrudes into the inside of the opening part 272t of the second seal member 272, to thereby expand the second seal member 272. With this, the inner peripheral part 272i of the second seal member 272 is brought into intimate contact with the inclined surface 315a of the first housing 31, and the outer peripheral part 272o of the second seal member 272 is brought into contact with the second hole part 4d of the cylinder head 4.

Then, it is possible to suppress inflow of the combustion gas into the rear end side relative to the holding member H where the second seal member 272 is provided. Further, on the rear end side of the second seal member 272 in the pressure detection device 5, occurrence of sharp temperature difference between the inside and the outside caused by temperature rise due to inflow of the combustion gas is suppressed.

Exemplary Embodiment 3

Figure 8C:
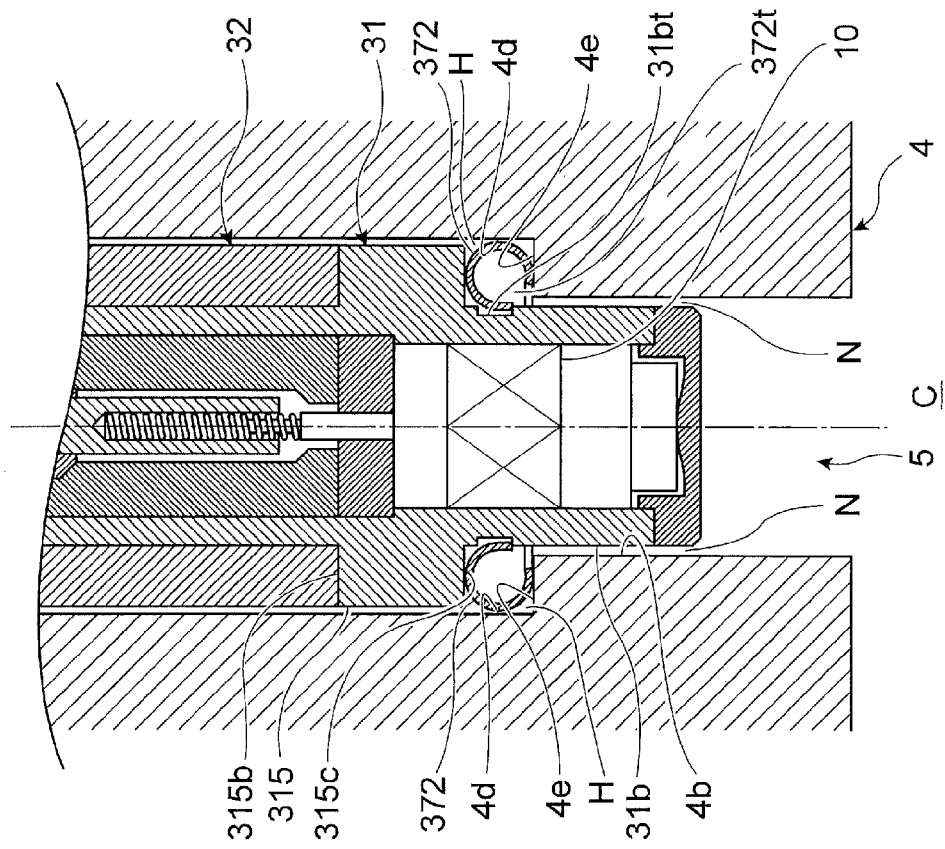
FIGS. 8A to 8C are diagrams for illustrating the internal combustion engine according to Exemplary embodiment 3.
Figure 8A:
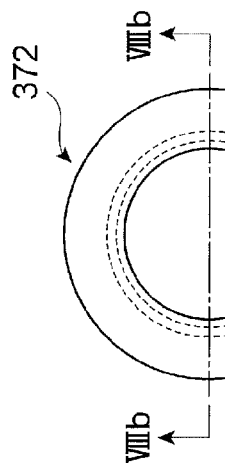
Figure 8B:
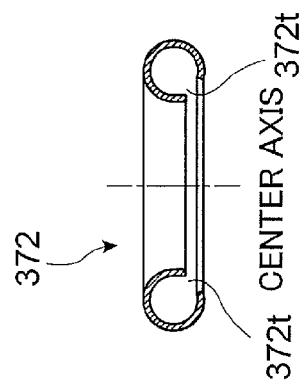

FIGS. 8A to 8C are diagrams for illustrating the internal combustion engine 1 according to Exemplary embodiment 3.

It should be noted that components similar to those of the internal combustion engine 1 according to Exemplary embodiment 1 are assigned with the same reference signs, and detailed descriptions thereof will be omitted.

FIG. 8A shows an overall view of the second seal member 372, FIG. 8B shows a VIIIb-VIIIb cross section shown in FIG. 8A, and FIG. 8C shows a state in which the second seal member 372 in Exemplary embodiment 3 is provided between the pressure detection device 5 and the cylinder head 4.

As shown in FIG. 8C, in the internal combustion engine 1 according to Exemplary embodiment 3, the protruding part 315 in the housing 31 of the pressure detection device 5 includes, at the front end part thereof, a second vertical surface 315c that is vertical to the centerline direction, and at the rear end part thereof, a vertical surface 315b that is vertical to the centerline direction.

Moreover, the communication hole 4a of the cylinder head 4 in Exemplary embodiment 3 includes, from the combustion chamber C side, the first hole part 4b, the second hole part 4d having a hole diameter larger than the hole diameter of the first hole part 4b and a step part 4e that is provided between the first hole part 4b and the second hole part 4d and forms a step vertical to the center axis direction.

Then, the internal combustion engine 1 according to Exemplary embodiment 3 has the second seal member 372 that seals a space between the cylinder head 4 and the pressure detection device 5.

In the internal combustion engine 1 according to Exemplary embodiment 3, as shown in FIG. 8C, in a state where the pressure detection device 5 is mounted to the cylinder head 4, a distance is provided between the second vertical surface 315c of the pressure detection device 5 and the step part 4e of the cylinder head 4 so that the second seal member 372 can be sandwiched therebetween. Then, in the internal combustion engine 1 according to Exemplary embodiment 3, the holding part H for holding the second seal member 372 of Exemplary embodiment 3 is formed by the second vertical surface 315c and the side face 31b (the step part 31bt) and by the second hole part 4d and the step part 4e. In Exemplary embodiment 3, as shown in FIG. 8C, the cross section of the holding part H has a rectangular shape.

The second seal member 372 is a component that suppresses inflow of the combustion gas into the gap between the inner wall of the cylinder head 4 and the outer wall of the housing 30 of the pressure detection device 5. The second seal member 372 is, as shown in FIG. 8C, arranged in the holding part H. The holding part H of the exemplary embodiment is formed at a position of the piezoelectric element 10 in a center axis direction of the housing 30 (side). Accordingly, the second seal member 372 suppresses inflow of the combustion gas into the rear end side in the center axis direction relative to the position where the piezoelectric element 10 is provided between the cylinder head 4 and the pressure detection device 5.

As shown in FIG. 8A, the second seal member 372 is an annular component and is formed to have a hollow interior. Further, the second seal member 372 has an opening part 372t, which is an annular incision formed over an entire periphery on one end side in the center axis direction.

The inner diameter of the second seal member 372 is, in the state of before being mounted, set slightly smaller than the outer diameter of the side face 31b (in the exemplary embodiment, the outer diameter of the step part 31bt) of the first housing 31 of the pressure detection device 5. Moreover, the outer diameter of the second seal member 372 is set slightly larger than the inner diameter of the second hole part 4d in the communication hole 4a of the cylinder head 4. When the second seal member 372 is mounted to the internal combustion engine 1, an inner peripheral part of the second seal member 372 comes into intimate contact with the outer periphery of the first housing 31, and an outer peripheral part thereof comes into intimate contact with the inner periphery of the second hole part 4d.

Moreover, the cross section of the second seal member 372 has, as shown in FIG. 8B, an opening shape because the opening part 372t is provided. The opening part 372t is provided at one end part in the center axis direction. Moreover, the opening part 372t is, as shown in FIG. 8B, inclined with respect to the center axis so that the opening part 372t faces toward the gap N positioned on the center axis side and the combustion chamber C side when mounted.

Further, the cross section of the second seal member 372 has a circular shape in the case of being cut in the center axis direction. As shown in FIG. 8C, the holding part H, in which the second seal member 372 is arranged, has a rectangular shape. Then, in the exemplary embodiment, the second seal member 372 is formed in the circular shape so as to follow the cross-sectional shape of the holding part H, to thereby increase intimate contact property with the holding part H.

Then, the thickness of a material of the second seal member 372 is set to an extent capable of deforming when the second seal member 372 is mounted to the first housing 31, or, when the combustion gas flows from the opening part 372t into the inside.

It should be noted that, as the material of the second seal member 372 in the exemplary embodiment, a metal such as copper, stainless steel, aluminum and the like can be used. In addition, as the material of the second seal member 372 in the exemplary embodiment, Tefron (Japanese registered trademark) and the like can be used.

Then, as shown in FIG. 8C, the second seal member 372 is arranged in the holding part H in the state in which the pressure detection device 5 is mounted to the cylinder head 4. Moreover, in the exemplary embodiment, the second seal member 372 is held by the first housing 31 in such a way that a part of the inner peripheral part of the second seal member 372 is fitted into the step part 31bt. Then, the second seal part 372 is mounted so that the opening part 372t faces toward the gap N that extends to the combustion chamber C. The second seal member 372 is provided in a state in which the opening part 372t is opened toward the combustion chamber C.

When the internal combustion engine 1 is operated, the combustion gas generated by combustion in the combustion chamber C enters the gap N as shown in FIG. 8C. Then, the combustion gas having entered the gap N reaches the second seal member 372. The combustion gas intrudes into the inside of the opening part 372t of the second seal member 372, to thereby expand the second seal member 372. With this, the second seal member 372 is brought into intimate contact with the side face 31b (the step part 31bt) and the second vertical surface 315c, and the second hole part 4d and the step part 4e.

Then, the second seal member 372 suppresses inflow of the combustion gas into the rear end side relative to the holding member H where the second seal member 372 is provided. As a result, on the rear end side of the second seal member 372 in the pressure detection device 5, occurrence of sharp temperature difference between the inside and the outside caused by temperature rise due to inflow of the combustion gas is suppressed.

Exemplary Embodiment 4

Figure 9C:
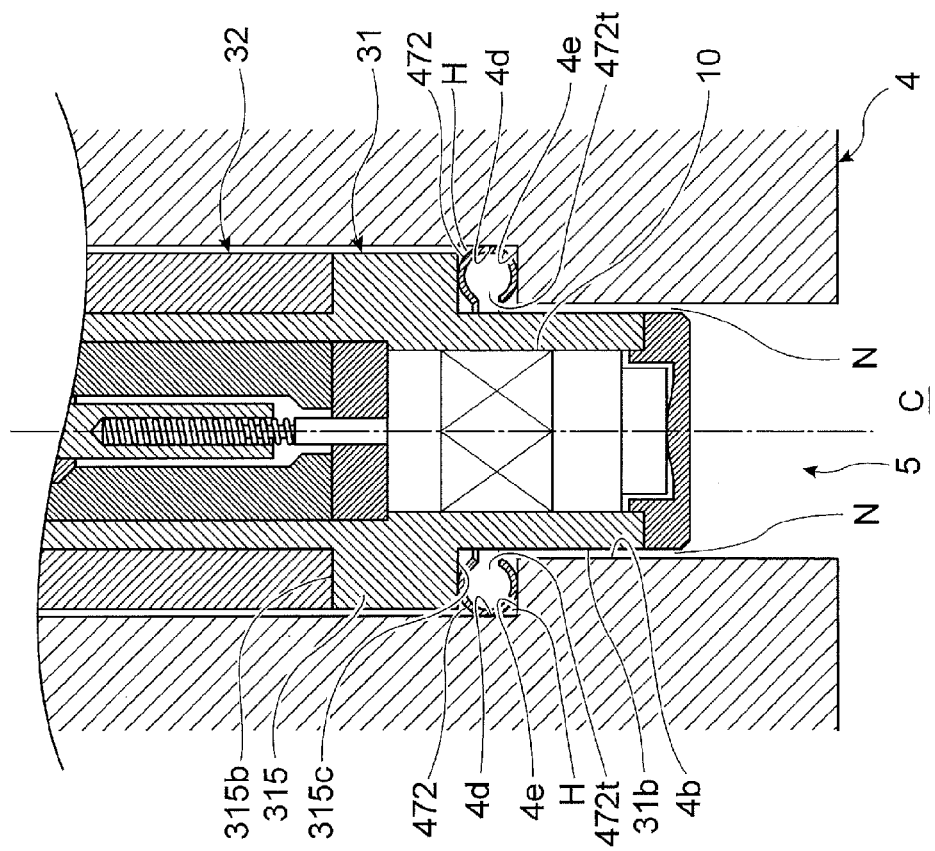
FIGS. 9A to 9C are diagrams for illustrating the internal combustion engine according to Exemplary embodiment 4.
Figure 9A:
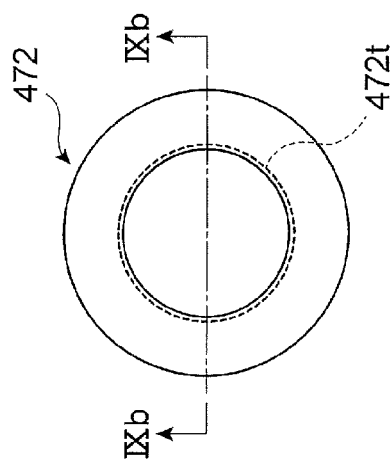
Figure 9B:
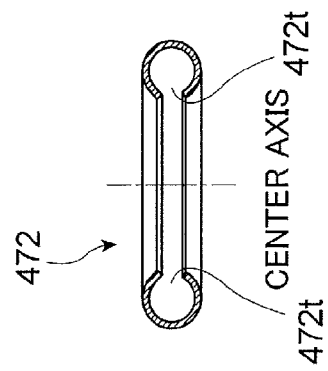

FIGS. 9A to 9C are diagrams for illustrating the internal combustion engine 1 according to Exemplary embodiment 4.

It should be noted that components similar to those of the internal combustion engine 1 according to Exemplary embodiment 1 are assigned with the same reference signs, and detailed descriptions thereof will be omitted.

FIG. 9A shows an overall view of the second seal member 472, FIG. 9B shows a IXb-IXb cross section shown in FIG. 9A, and FIG. 9C shows a state in which the second seal member 472 is provided between the pressure detection device 5 and the cylinder head 4.

As shown in FIG. 9C, in the internal combustion engine 1 according to Exemplary embodiment 4, the protruding part 315 in the first housing 31 of the pressure detection device 5 includes, at the front end part thereof, a second vertical surface 315c, as an example of a shoulder part, that is vertical to the centerline direction, and at the rear end part thereof, a vertical surface 315b that is vertical to the centerline direction.

Moreover, the communication hole 4a of the cylinder head 4 in Exemplary embodiment 4 includes, from the combustion chamber C side, the first hole part 4b, the second hole part 4d having a hole diameter larger than the hole diameter of the first hole part 4b and a step part 4e that is provided between the first hole part 4b and the second hole part 4d and forms a step vertical to the center axis direction.

Then, the internal combustion engine 1 according to Exemplary embodiment 4 has the second seal member 472 that seals a space between the cylinder head 4 and the pressure detection device 5.

In the internal combustion engine 1 according to Exemplary embodiment 4, as shown in FIG. 9C, in a state where the pressure detection device 5 is mounted to the cylinder head 4, a distance is provided between the second vertical surface 315c and the step part 4e so that the second seal member 472 can be sandwiched therebetween. Then, in the internal combustion engine 1 according to Exemplary embodiment 4, the holding part H for holding the second seal member 472 of Exemplary embodiment 4 is formed by the second vertical surface 315c and the side face 31b and by the second hole part 4d and the step part 4e. In Exemplary embodiment 4, as shown in FIG. 9C, the cross section of the holding part H has a rectangular shape.

The second seal member 472 is a component that suppresses inflow of the combustion gas into the gap between the inner wall of the cylinder head 4 and the outer wall of the housing 30 of the pressure detection device 5. The second seal member 472 is, as shown in FIG. 9C, arranged in the holding part H. The holding part H of the exemplary embodiment is formed at a position of the piezoelectric element 10 in a center axis direction of the housing 30 (side). Accordingly, the second seal member 472 suppresses inflow of the combustion gas into the rear end side in the center axis direction relative to the position where the piezoelectric element 10 is provided between the cylinder head 4 and the pressure detection device 5.

As shown in FIG. 9A, the second seal member 472 is an annular component and is formed to have a hollow interior. Further, the second seal member 472 has an opening part 472t, which is an annular incision formed over an entire periphery of the inner peripheral surface at substantially a center part in the center axis direction and faces toward the center axis side.

The inner diameter of the second seal member 472 is, in the state of before being mounted, set larger than the outer diameter of the side face 31b of the first housing 31 of the pressure detection device 5. Moreover, the outer diameter of the second seal member 472 is set slightly larger than the inner diameter of the second hole part 4d in the communication hole 4a of the cylinder head 4. When the second seal member 472 is mounted to the internal combustion engine 1, an inner peripheral part of the second seal member 472 forms a gap with the outer periphery of the first housing 31, and an outer peripheral part thereof comes into intimate contact with the second hole part 4d.

The cross section of the second seal member 472 has a circular shape in the case of being cut in the center axis direction. As shown in FIG. 9C, the holding part H, in which the second seal member 472 is arranged, has a rectangular shape. Then, in the exemplary embodiment, the cross section of the second seal member 472 is formed in the circular shape so as to follow the cross-sectional shape of the holding part H, to thereby increase intimate contact property with the holding part H.

Moreover, the thickness of a material of the second seal member 472 is set to an extent capable of deforming when the second seal member 472 is mounted to the first housing 31, or, when the combustion gas flows from the opening part 472t into the inside.

It should be noted that, as the material of the second seal member 472 in Exemplary embodiment 4, a metal such as copper, stainless steel, aluminum and the like can be used. In addition, as the material of the second seal member 472 in Exemplary embodiment 4, Tefron (Japanese registered trademark) and the like can be used.

Then, as shown in FIG. 9C, the second seal member 472 is arranged in the holding part H in the state in which the pressure detection device 5 is mounted to the cylinder head 4. The second seal member 472 is provided in a state in which the opening part 472*t* faces toward the center axis direction.

When the internal combustion engine 1 is operated, the combustion gas generated by combustion in the combustion chamber C enters the gap N as shown in FIG. 9C. Then, the combustion gas having entered the gap N reaches the second seal member 472. The combustion gas intrudes into the inside of the opening part 472*t* of the second seal member 472, to thereby expand the second seal member 472 in the center axis direction and outward in the peripheral direction. With this, the second seal member 472 is brought into intimate contact with the second vertical surface 315*c* of the first housing 31, and the second hole part 4*d* and the step part 4*e* of the cylinder head 4.

Then, the second seal member 472 suppresses inflow of the combustion gas into the rear end side relative to the holding member H where the second seal member 472 is provided. As a result, on the rear end side of the second seal member 472 in the pressure detection device 5, occurrence of sharp temperature difference between the inside and the outside caused by temperature rise due to inflow of the combustion gas is suppressed.

As described above, in each of Exemplary embodiments 1 to 4, as shown in FIGS. 6 to 9, respectively, the second seal member 72 (272, 372 or 472) having a opening shape is provided at the shoulder part embodied as the tapered part or the step part in the housing 30 of the pressure detection device 5. Accordingly, the combustion gas generated in the combustion chamber C, although pushed into the center axis direction by expansion of the second seal member 72 (272, 372 or 472), is held because the second seal member 72 (272, 372 or 472) receives reaction by the shoulder part having a surface facing toward the center axis direction. Then, sealing (intimate contact) property for the gap between the pressure detection device 5 and the cylinder head 4 is increased.

It should be noted that, in the exemplary embodiments, the piezoelectric element 10 is used as the detection component for detecting pressure; however, the detection component is not limited thereto. The detection component just has to detect the pressure upon receiving a force through the diaphragm head 40, and, for example, a strain sensor or the like may be used as the detection component.

Moreover, in the exemplary embodiments, the first seal member 71 shown in FIG. 2 and the second seal member 72 (272, 372 or 472) shown in FIGS. 2, 6A to 9C are used; however, there is no limitation to these modes. For example, the opening between the pressure detection device 5 and the cylinder head 4 may be sealed by use of only the second seal member 72 (272, 372 or 472).

REFERENCE SIGNS LIST

1 . . . Internal combustion engine
2 . . . Cylinder block
3 . . . Piston
4 . . . Cylinder head
5 . . . Pressure detection device
7 . . . Seal member
10 . . . Piezoelectric element
30 . . . Housing
40 . . . Diaphragm head
50 . . . First electrode part
55 . . . Second electrode part
60 . . . Insulating ring
65 . . . Supporting member
70 . . . Coil spring
71 . . . First seal member
72, 272, 372, 472 . . . Second seal member
100 . . . Sensor part
200 . . . Signal processor

The invention claimed is:

1. An internal combustion engine fitted with a combustion pressure detection device, comprising:
   the internal combustion engine including a combustion chamber and an opening formed on a wall surface constituting the combustion chamber, the opening connecting to the combustion chamber and having a wider diameter on a near side than on a far side thereof;
   the combustion pressure detection device including: a housing having a cylindrical shape that is insertable into the opening of the internal combustion engine, the housing being narrower on a front end side thereof in an insertion direction in accordance with the diameter of the opening on the far side, and being wider on a rear end side thereof in accordance with the diameter of the opening on the near side, and the housing having a shoulder part between the front end side and the rear end side thereof; a diaphragm provided on the front end side of the housing in the insertion direction; and a detection member arranged inside the housing and behind the diaphragm, and detecting the pressure working via the diaphragm; and
   a seal member in a ring shape that has a cross section in an opening shape, the seal member sealing the opening in the combustion chamber and the housing at the shoulder part of the housing in the combustion pressure detection device, wherein
   the housing includes a step part on the front end side in the insertion direction relative to the shoulder part, and
   the seal member is held by the housing by latching an opening edge part of an opening part in the opening shape onto the step part.

2. The internal combustion engine fitted with the combustion pressure detection device according to claim 1, wherein, in the seal member, the opening part opens toward the combustion chamber.

3. The internal combustion engine fitted with the combustion pressure detection device according to claim 1, wherein the detection member of the combustion pressure detection device is provided on an end part of the housing, which is on a side of the housing that faces the combustion chamber, and the shoulder part of the housing is formed at a position of the detection member in the insertion direction.

4. The internal combustion engine fitted with the combustion pressure detection device according to claim 1, wherein the shoulder part of the housing is a tapered part having a diameter that gradually increases from the front end side toward the rear end side.

5. The internal combustion engine fitted with the combustion pressure detection device according to claim 4, wherein the seal member has a cross section in a horseshoe shape, and is provided along an inner wall of the opening formed on a wall surface constituting the combustion chamber and the tapered part of the housing.

6. The internal combustion engine fitted with the combustion pressure detection device according to claim 1, further comprising an outer seal member that is pushed in a same direction as the insertion direction of the housing, to thereby seal between the housing and the combustion chamber at an outside of the opening formed on a wall surface constituting the combustion chamber.

* * * * *